Dec. 3, 1929.  P. ISAAC  1,738,185
AGRICULTURAL IMPLEMENT
Filed Feb. 11, 1928   3 Sheets-Sheet 1
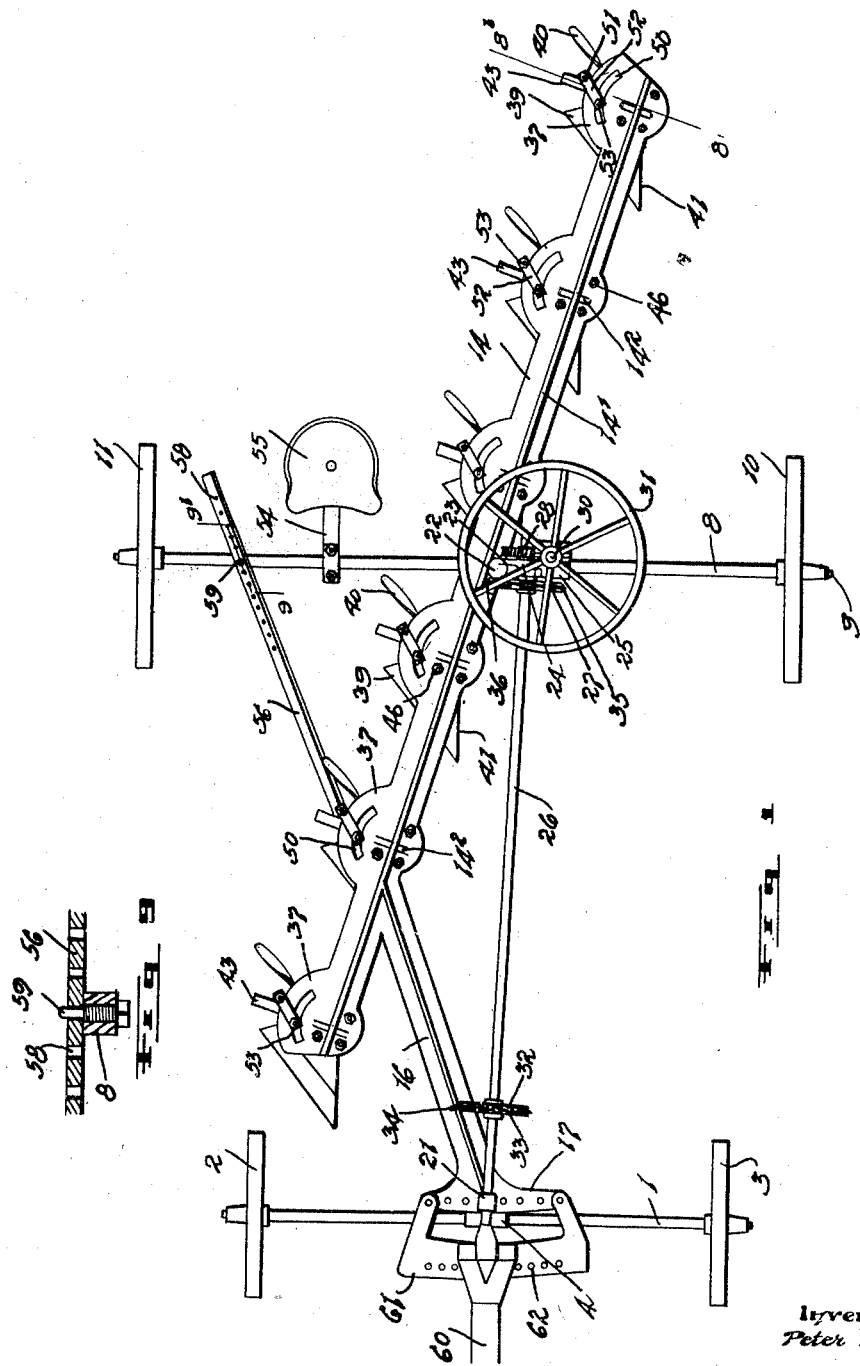
Inventor
Peter Isaac

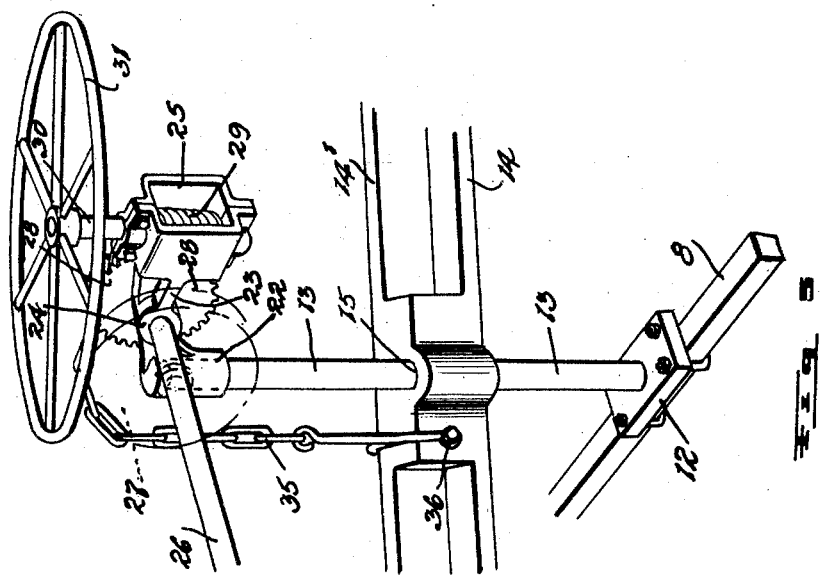
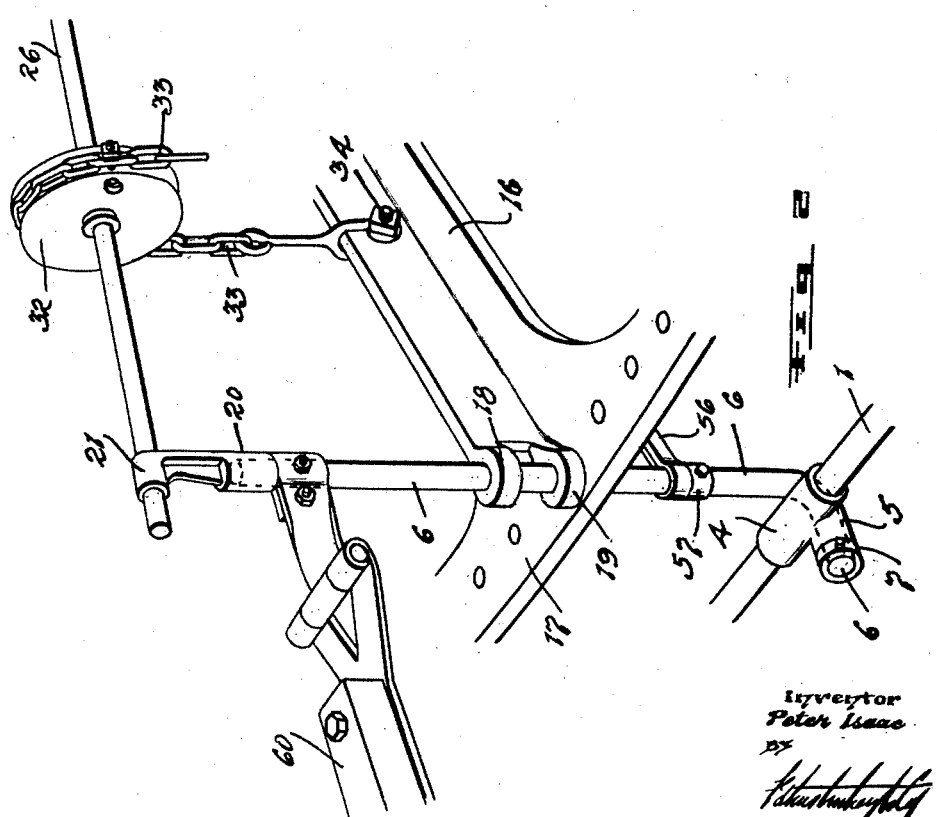

Dec. 3, 1929. P. ISAAC 1,738,185
AGRICULTURAL IMPLEMENT
Filed Feb. 11, 1928 3 Sheets-Sheet 3
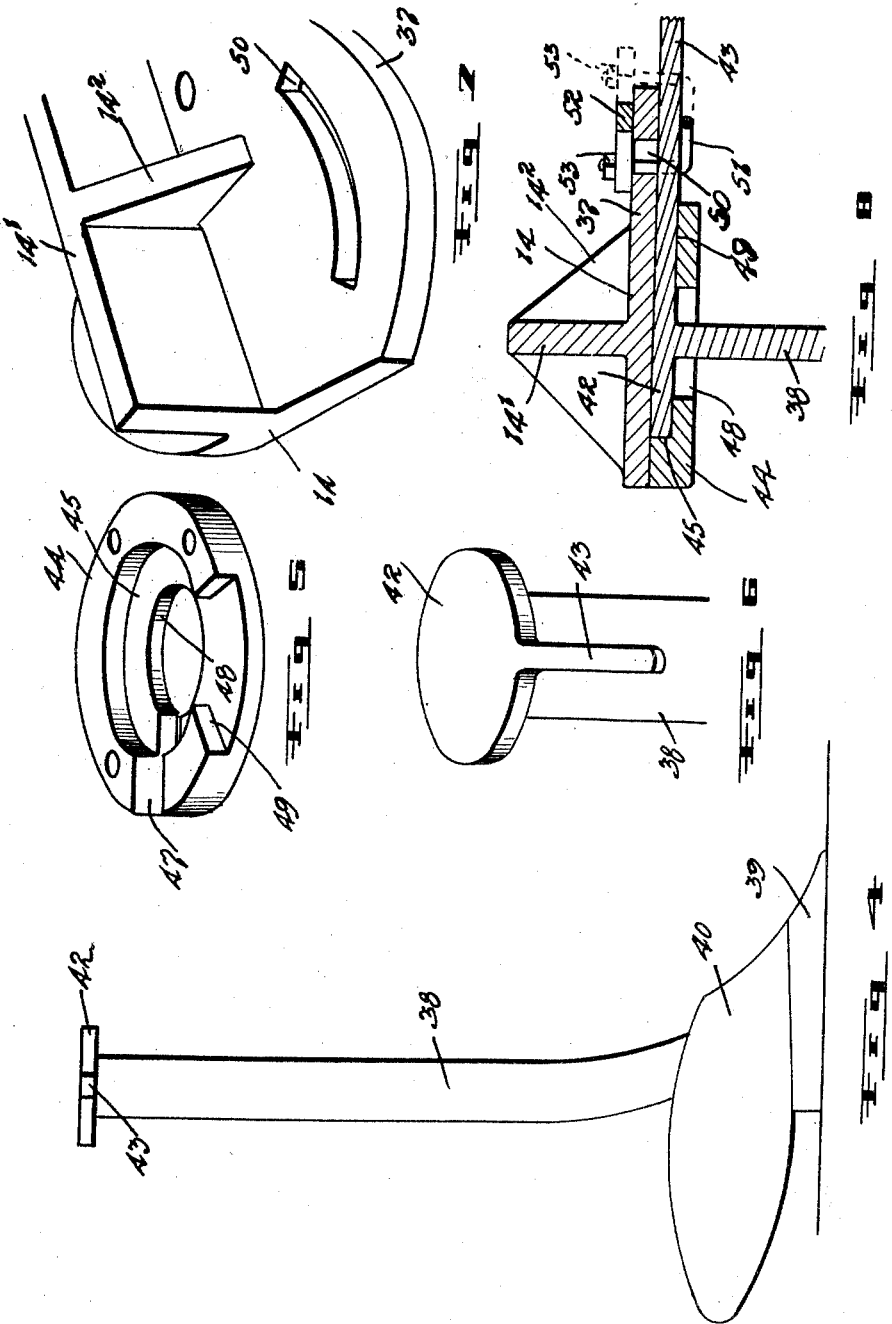
Inventor
Peter Isaac
By Patented Dec. 3, 1929

1,738,185

UNITED STATES PATENT OFFICE

PETER ISAAC, OF WINNIPEG, MANITOBA, CANADA

AGRICULTURAL IMPLEMENT

Application filed February 11, 1928, Serial No. 253,688, and in Canada February 14, 1927.

The invention relates to improvements in agricultural implements and an object of the invention is to provide an agricultural implement embodying a plurality of ploughs in staggered formation and each rotatable to permit of the varying of the angular position of the ploughs in respect to the direction of draft and in so doing allow a farmer to selectively set his ploughs as experience dictates depending on the condition of the land.

A further object of the invention is to provide means permitting of the simultaneous vertical adjustment of the ploughs to effect a deeper or shallower cut as occasion demands.

A further object is to provide an implement having the above type ploughs and wherein the angular position of the rear axle can be adjusted as well as the point of draft.

A further object of the invention is to provide an angularly disposed plough beam carrying the ploughs and means for adjustably suspending the plough beam, said latter means being readily controlled by an attendant riding on the machine.

With the above more important and other minor objects in view which will become more apparent as the description proceeds, the invention consists essentially in the arrangement and construction of parts hereinafter more particularly described, reference being had to the accompanying drawings, in which:—

Fig. 1 is a plan view of the machine.

Fig. 2 is a perspective view of parts located at the front end of the machine.

Fig. 3 is a perspective view of the hand wheel and other parts associated therewith for raising or lowering the plough beam.

Fig. 4 is a side view of one of the ploughs and the shank carrying the same.

Fig. 5 is a perspective view of the bearing plate which receives the head of the shank.

Fig. 6 is a perspective view of the head of the shank.

Fig. 7 is a perspective view of a portion of the plough beam.

Fig. 8 is an enlarged detailed vertical sectional view at 8—8' Figure 1.

Fig. 9 is an enlarged detailed vertical sectional view at 9—9' Figure 1.

In the drawings like characters of reference indicate corresponding parts in the several figures.

The front axle 1 of the machine is provided at the ends with the customary land wheels 2 and 3 and has secured centrally thereto a sleeve 4 which is formed integrally with a further underlying sleeve 5 positioned at right angles to the sleeve 4. The sleeve 5 receives pivotally the forwardly bent lower end of a front vertically disposed standard 6 and a collar 7 is attached to the standard to prevent the same from withdrawing from the sleeve.

The rear axle 8 has the body part thereof square in cross section and terminates in end spindles 9 on which are mounted rotatably the rear ground wheels 10 and 11. It will be observed that the rear axle is considerably longer than the front. To the rear axle I clamp a plate 12 to which is permanently fastened a vertically disposed rear standard 13. The plough beam 14 is angularly positioned as best shown in Figure 1 and is provided more or less centrally of its length with a vertically disposed hole 15 which slidably receives the rear standard.

The forward end of the plough beam is supplied with an extension arm 16 which terminates at its forward end in a T-shaped head 17, the head being provided centrally with vertically aligned bearing sleeves 18 and 19 which receive slidably the front standard 6. A socket 20 receives the upper end of the forward standard and the socket carries a forward horizontally disposed sleeve 21. A further socket 22 receives the upper end of the rear standard 13 and this socket carries a laterally extending arm 23 which is provided with a bearing sleeve 24 and a box 25. An adjusting shaft 26 is supplied, this having the forward end rotatably mounted in the bearing 21 and the rear end rotatably received in the bearing 24.

The rear end of the shaft is supplied with a chain wheel 27 positioned in front of the arm 23 and with a worm wheel 28 positioned to the rear of the latter arm. The worm wheel meshes continuously with a worm 29 located within the box 25 and carried by a vertical spindle 30 which is supplied at its upper end with a relatively large hand wheel 31. Forwardly the shaft 26 is supplied with a chain wheel 32 similar to that 27 and the chain wheel 32 carries a chain 33, the lower end of which is connected by a bolt 34 to the front end of the extension arm 16. The chain wheel 27 carries a chain 35 which is connected by a bolt 36 to the plough beam in a location adjoining the standard 13.

According to the above construction, it will be apparent that the shaft 26 and parts associated therewith are supported by the upper ends of the standards and that the plough beam is adjustably mounted on the standards and held in any adjusted position by the action of the worm and worm wheel.

The plough beam 14 is provided on the top side with a lengthwise extending upstanding rib or flange 14' which is suitable reinforced at intervals by laterally extending webs $14^2$. The plough beam is herein shown as supporting six equi-spaced ploughs and in the positions where the ploughs are to be located, the beam is provided with enlargements 37 utilized for a purpose later disclosed. As the ploughs are all similarly constructed and all similarly adjustably fastened to the plough beam, the description of one will suffice.

The plough shank 38 is of predetermined length and is substantially rectangular in horizontal cross section and has the lower end thereof carrying a plough share 39, a mould board 40 and a land side 41 which parts constitute what is generally termed a plough. The upper end of each shank terminates in a circular horizontal lying head 42, the head being provided with a laterally extending integrally formed lever 43. An annular bearing plate 44 is supplied to hold the head of each shank to the plough beam. The bearing plate is supplied with a circular ledge 45 which receives the head 43, the arrangement being such that when the head is inserted and the bearing plate is attached to the plough beam by the bolts 46, the head is swivelly attached to the beam so that the shank can be rotated and the plough set as desired.

In order to permit of the ready insertion of the heads, I have slotted each bearing plate as indicated at 47 and the shank is adapted to be passed edge on through the slot and into the open centre 48 of the bearing plate. Subsequently the shank is dropped down to let the head become seated on the ledge. The upper face of each bearing ring is cut away as indicated at 49 to provide an outlet opening for the lever 43 when the parts have been assembled.

Here it will be observed that the levers all extend outwardly to the side of the plough beam and that the enlargements of the plough beam are all provided with similar arcuate slots 50 formed concentric to the centre points of the bearing plates 44. The levers 43 underlie the enlargements and cross the slots and means is provided for fastening each lever in any adjusted position.

Such means embodies in the present instance a U-bolt 51 spanning the lever and having one end passing upwardly through the slot 50 and the other end passing upwardly to the outer side of the enlargement 37. A keeper plate 52 receives the ends of the U-bolt and rides the upper face of the enlargement. Obviously upon the nuts 53 of the U-bolts being tightened down, the U-bolts will effectively clamp the lever in any adjusted position. One can obviously change the position of the lever and consequently of the plough by releasng the bolts 53 and setting the lever as desired.

To the rear axle I secure permanently a spring bar 54 which supports the operators seat 55 and here it will be observed that this seat is within convenient range of the hand wheel 31. An adjusting bar 56 extends between the rear axle and the front standard 6. This adjusting bar has the forward end thereof swivelly mounted on the standard in the manner best shown in Figure 2 and supported by a collar 57 fastened to the standard. The rear end of the bar 56 overlies the rear axle at the end adjoining the wheel 11 and is provided with a series of suitably spaced adjusting holes 58 any one of which is adapted to receive a stationary pin 59 extending upwardly from the rear axle.

The arrangement is such that one can readily advance or move back the end of the rear axle carrying the wheel 11 by simply raising the rear end of the bar 56 and shifting the rear axle. When the required adjustment is made, the pin 59 is passed into the then overlying opening 58 and the axle is then held in such adjusted position by the bar.

The steering tongue 60 is connected to the upper end of the front standard 6 in the manner best shown in Figure 2 and a hitching plate 61 is fastened to the end 17 of the extension arm 16, the hitching plate being provided at its forward edge with a row of suitably spaced transversely extending bolt openings 62.

When the machine is in use and one varies the position of the ploughs by rotating them, he will also adjust the position of the rear axle in respect to the bar 56 and the point of draft as provided for by the holes 62.

At the present time where gang ploughs are employed, there is no means provided for permitting of the rotation of the ploughs to vary them depending on land conditions and consequently there can be no difference at any time in the width of the strip of land ploughed by the ploughs.

It will be apparent that if comparatively light land is encountered, the same draft animals or tractor for that matter could pull a heavier load and that such could be brought about by causing the ploughs to cut a wider furrow. My machine permits of this. In light land one simply turns the ploughs in an anti-clockwise direction and makes the necessary adjustments in the position of the rear axle and in the position at which the point of draft is to be applied. Each individual plough will then cut a wider furrow than previously and the total width of the strip of land ploughed by all the ploughs will be considerably wider than if no such adjustment were made. Accordingly light land can be ploughed much more quickly. When heavy land is encountered, the ploughs can be turned in a clockwise direction so that they will not cut so wide a furrow and such materially aids the draft animals, it being necessary at such time also to adjust the rear axle and the point of draft.

I might point out that in my machine, each following plough covers the plough directly in advance under all adjusted conditions so that the total width of the strip of land ploughed by the machine is equal to the sum of the widths of the furrows of the ploughs in all cases and by adjusting the machine as explained, the width of the strip can be varied depending on soil conditions.

What I claim as my invention is:—

1. An agricultural implement comprising front and rear axles and ground wheels carrying the same, forward and rear upwardly extending standards carried by the axles, the rear standard being permanently fastened to the rear axle and the forward standard having the lower end thereof rotatably attached to the front axle, an angularly disposed plough beam slidably mounted on the rear standard and provided with an extension arm slidably mounted on the forward standard, means for selectively raising or lowering the plough beam in respect to the standards and for retaining said plough beam in any selected position, a bar extending between the front standard and one end of the rear axle and adjustably connected to the latter, a hitching plate connected to the forward end of the extension arm and provided with a series of hitching holes permitting of a variation in the point of application of the draft, vertically disposed, equi-spaced plough shanks having their upper ends connected to the plough beam to permit of the rotation of the shanks into any desired rotated position and ploughs secured to the lower ends of the shanks.

2. An agricultural implement comprising front and rear axles and ground wheels carrying the same, forward and rear upwardly extending standards carried by the axles, the rear standard being permanently fastened to the rear axle and the forward standard having the lower end thereof rotatably attached to the front axle, an angularly disposed plough beam slidably mounted on the rear standard and having the forward end thereof provided with an angularly extending extension arm, the forward end of which is slidably mounted on the forward standard, means for raising or lowering the beam and extension thereof in respect to the standards and for retaining said beam and extension thereof in any selected adjusted position, an adjustable connection extending between the front standard and one end of the rear axle and a plurality of ploughs underlying and carried by the plough beam and adjustably mounted in respect to the beam to permit of the rotation of the ploughs around a vertical axis.

3. The combination with front and rear axles, of front and rear upstanding standards supported by the axles, the front standard being pivotally connected to the front axle and the rear standard permanently connected to the rear axle, sockets mounted on the upper ends of the standards, said sockets being provided with aligned bearing sleeves, an adjusting shaft rotatably carried by the bearing sleeves, an angularly disposed plough beam having the rear end thereof slidably mounted on the rear standard and the forward end thereof provided with an angularly positioned extension arm slidably mounted on the front standard, manually operated means for rotating the shaft, means automatically locking the shaft in any rotated position, winding connections between the shaft and the plough beam and the shaft and the extension arm, an adjustable connection extending between the front standard and one end of the rear axle and a plurality of equi-spaced ploughs underlying and carried by the plough beam and adjustably connected to the plough beam to permit of the rotation of each plough around a vertical axis.

Signed at Winnipeg, this 17 day of December, 1927.

PETER ISAAC.